United States Patent
Kanukotla et al.

(10) Patent No.: US 12,032,974 B2
(45) Date of Patent: Jul. 9, 2024

(54) METHOD AND ELECTRONIC DEVICE FOR ACCELERATING ASSET EXECUTION

(71) Applicant: SAMSUNG ELECTRONICS CO., LTD., Suwon-si (KR)

(72) Inventors: Anuradha Kanukotla, Karnataka (IN); Sumeen Agrawal, Karnataka (IN); Jaeho Kim, Suwon-si (KR); Kumar Abhisek, Karnataka (IN); Pavan Nittur, Karnataka (IN); Sripurna Mutalik, Karnataka (IN); Wonseo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 805 days.

(21) Appl. No.: 17/144,538

(22) Filed: Jan. 8, 2021

(65) Prior Publication Data
US 2021/0216335 A1    Jul. 15, 2021

(30) Foreign Application Priority Data

Jan. 10, 2020 (IN) .............................. 202041001207
Dec. 9, 2020 (IN) .............................. 202041001207

(51) Int. Cl.
*G06F 9/451* (2018.01)
*G06F 9/50* (2006.01)
(Continued)

(52) U.S. Cl.
CPC ............ *G06F 9/451* (2018.02); *G06F 9/5016* (2013.01); *G06N 5/04* (2013.01); *G06N 20/00* (2019.01)

(58) Field of Classification Search
CPC .. G06F 9/451; G06F 9/5016; G06F 2209/509; G06F 9/445; G06F 9/5027;
(Continued)

(56) References Cited

U.S. PATENT DOCUMENTS 10,225,365 B1 *  3/2019  Hotchkies ............... H04L 67/63
10,311,371 B1 *  6/2019  Hotchkies ............... H04L 67/02
(Continued)

FOREIGN PATENT DOCUMENTS

CN      106462123       2/2017
CN      105955766       8/2019
(Continued)

OTHER PUBLICATIONS

International Search Report issued Apr. 19, 2021 in corresponding International Application No. PCT/KR2021/000174.
(Continued)

*Primary Examiner* — Hien L Duong
(74) *Attorney, Agent, or Firm* — Nixon & Vanderhye, P.C.

(57) ABSTRACT

Embodiments of the disclosure provide a method for accelerating an asset execution in an electronic device. The method includes: detecting, by the electronic device, a user interface (UI) transition associated with a first application; predicting, by the electronic device, a sequence of at least one asset to be offloaded for a subsequent UI transition based on an asset parameter using a ML model, wherein the subsequent UI transition is associated with the first application or a second application; offloading, by the electronic device, the at least one asset in the sequence; and storing, by the electronic device, the at least one offloaded asset to a memory of the electronic device.

18 Claims, 7 Drawing Sheets

(51) Int. Cl.
*G06N 5/04* (2023.01)
*G06N 20/00* (2019.01)

(58) Field of Classification Search
CPC .......... G06N 5/04; G06N 20/00; G06N 3/044; G06N 7/01
See application file for complete search history.

(56) References Cited

U.S. PATENT DOCUMENTS

| | | | |
|---|---|---|---|
| 10,423,463 B1* | 9/2019 | Wilt | ............ G06F 9/5027 |
| 2011/0040718 A1 | 2/2011 | Tendjoukian et al. | |
| 2011/0145362 A1 | 6/2011 | Jones et al. | |
| 2014/0337255 A1* | 11/2014 | Eads | ............ G06N 20/00 706/12 |
| 2014/0337269 A1* | 11/2014 | Eads | ............ G06N 5/02 706/46 |
| 2015/0248193 A1* | 9/2015 | Fujioka | ............ G06Q 30/0269 705/14.66 |
| 2017/0006128 A1 | 1/2017 | Graham-Cumming et al. | |
| 2017/0017576 A1* | 1/2017 | Cammarota | ........ G06F 12/0893 |
| 2018/0183891 A1* | 6/2018 | Zhang | ............ H04L 67/125 |
| 2019/0138325 A1* | 5/2019 | Chen | ............ G06N 7/00 |
| 2019/0281128 A1 | 9/2019 | Zhang et al. | |
| 2019/0347128 A1* | 11/2019 | Han | ............ G06F 9/44578 |
| 2021/0279613 A1* | 9/2021 | Yu | ............ G06F 3/0482 |

FOREIGN PATENT DOCUMENTS

| | | |
|---|---|---|
| EP | 3149547 | 6/2019 |
| JP | 2014-160402 | 9/2014 |

OTHER PUBLICATIONS

Indian Office Action issued Apr. 26, 2023 in corresponding Indian Patent Application No. 202041001207.

* cited by examiner

FIG. 5A
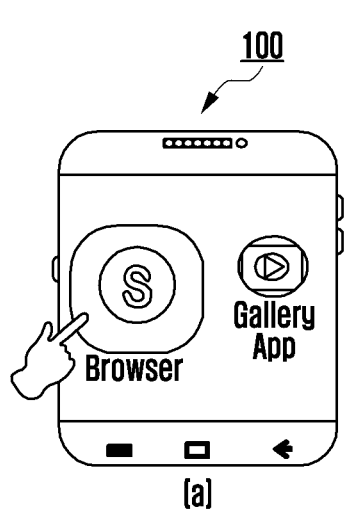
(a)
| | Asset 1(A1) | Asset 2(A2) | Asset 3(A3) | Asset 4(A4) | Asset 5(A5) |
|---|---|---|---|---|---|
| Asset ID | 29746315 | 28640550 | 28610739 | 28610738 | 28641397 |
| Asset Type (.ext) | .so | .xml | .png | .xml | .png |
| Time interval (sec) | 0.0 - 0.5 | 0.0 - 0.5 | 0.0 - 0.5 | 0.0 - 0.5 | 0.0 - 0.5 |
| Loading time (ms) | 1.725 | 0.135 | 20.785 | 0.095 | 0.496 |
| Frequency | 5 | 5 | 5 | 6 | 4 |
| Memory usilised (bytes) | 974,848 | 1,536 | 102,400 | 1,078 | 5,115 |
| Theme ID | 0 | 21235650 | 21441233 | 34004385 | 34341225 |
(b)
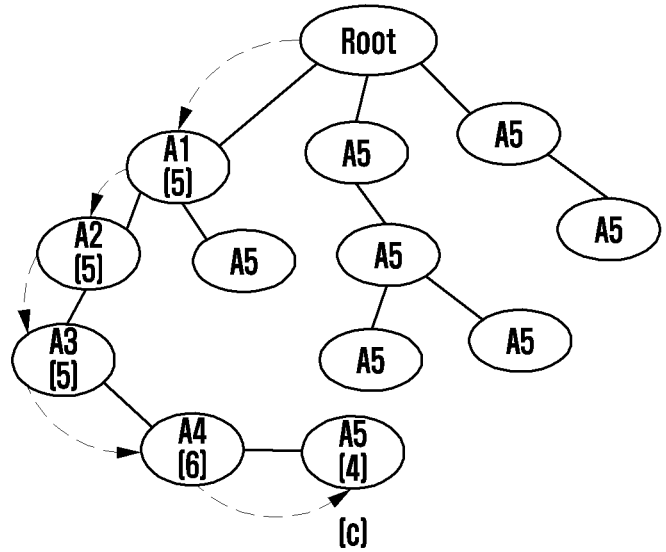
(c)

FIG. 6
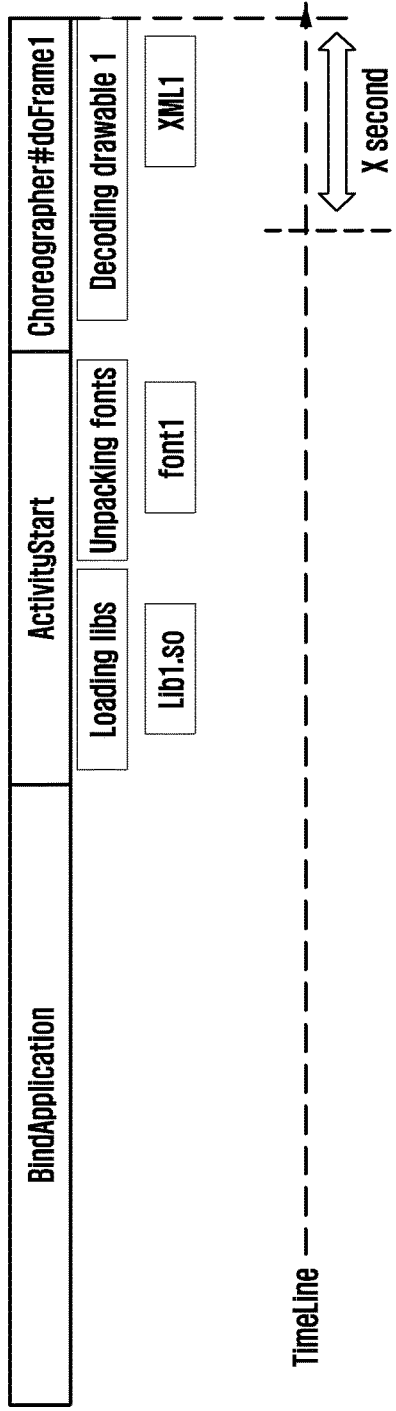
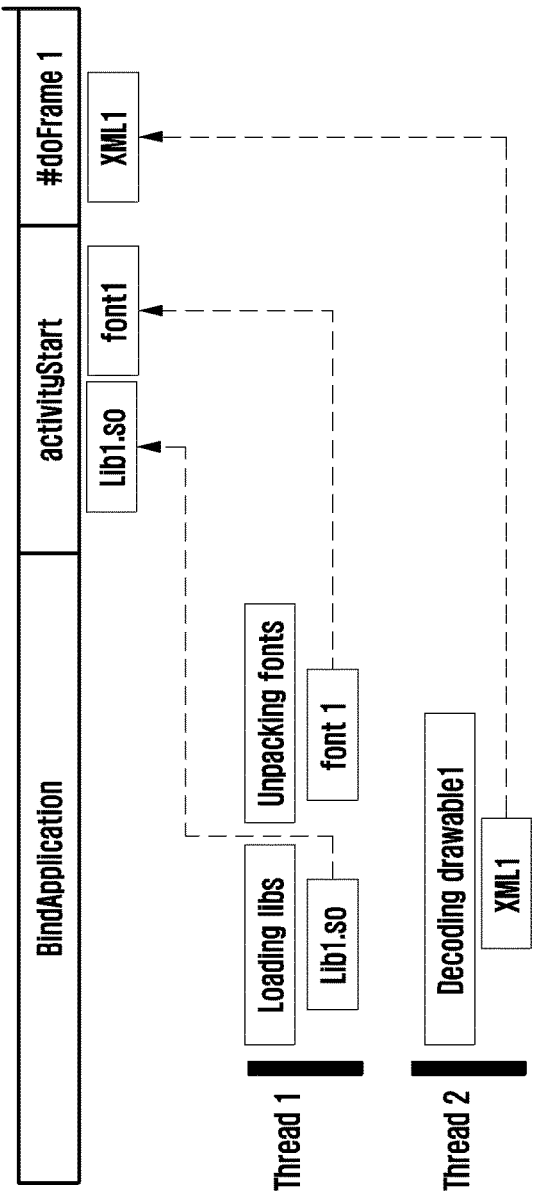

METHOD AND ELECTRONIC DEVICE FOR ACCELERATING ASSET EXECUTION

CROSS-REFERENCE TO RELATED APPLICATIONS

This application is based on and claims priority under 35 U.S.C. § 119 to Indian Provisional Patent Application No. 202041001207, filed on Jan. 10, 2020, in the Indian Intellectual Property Office and Indian Non-Provisional Patent Application No. 202041001207, filed on Dec. 9, 2020, in the Indian Intellectual Property Office, the disclosures of which are incorporated by reference herein in their entireties.

BACKGROUND

Field

The disclosure relates to an electronic device, and for example, to a method and the electronic device for accelerating an asset execution.

Description of Related Art

An asset of an application may refer, for example, to a set of one or more related artifacts that have been created or harvested for the purpose of applying that asset repeatedly in subsequent application development environments. Moreover, the asset may be a static immutable resourceful material employed by an application code during execution of the asset. Examples for the asset include drawables and animations (e.g. png, qmg, bmp, xml, svg, wbp, etc.), libraries (e.g. .so) and fonts (e.g. .ttf).

During a transition of a User Interface (UI), e.g., a UI transition of the application such as launching the application from a home screen, scrolling within the UI, selecting an option in the UI, etc. the electronic device loads the asset in the main UI thread to decode the asset. Decoding is a process of converting encoded files, i.e. asset (e.g. .png, .qmg, .bmp, .xml, .svg, .so, .ttf) into an executable format. Additionally, certain runtime attributes to be applied on top of the executable format in order to be used by the application. Further, the electronic device executes the asset for changing the UI, in response to decoding the asset. Since, the electronic device loads the asset in the main UI thread only when the asset is needed, a delay in the UI transition occurs at the electronic device due to consuming time in decoding and loading the asset in the main UI thread. In certain application launches at the electronic device, a large amount of time is required to load huge multimedia drawables and other large-sized assets in any phase of the application or activity life cycle. Further, a significant delay in the application launch and frame drops occur at the electronic device due to consuming a large amount of time in loading the asset. Thus, it is desired to address the above-mentioned shortcomings or at least provide a useful alternative.

SUMMARY

Embodiments of the disclosure provide a method and an electronic device for accelerating an asset execution.

Embodiments of the disclosure may predict a sequence of assets to be offloaded for a subsequent UI transition in response to detecting a UI transition.

Embodiments of the disclosure may offload the assets in the sequence and store the offloaded assets to a memory.

Embodiments of the disclosure may retrieve the at least one offloaded asset from the memory and execute the at least one offloaded asset based on the sequence, in response to detecting the subsequent UI transition.

Embodiments of the disclosure may minimize and/or reduce a delay in the UI transition at the electronic device.

Accordingly, example embodiments provide a method for accelerating an asset execution in an electronic device. The method includes: detecting, by the electronic device, a user interface (UI) transition associated with a first application; predicting, by the electronic device, a sequence of at least one asset to be offloaded for a subsequent UI transition based on an asset parameter using a Machine Learning (ML) model, wherein the subsequent UI transition is associated with the first application or a second application; offloading, by the electronic device, the at least one asset in the sequence; and storing, by the electronic device, the at least one offloaded asset to a memory of the electronic device.

In an example embodiment, the method includes: detecting, by the electronic device, the subsequent UI transition; retrieving, by the electronic device, the at least one offloaded asset from the memory; and executing, by the electronic device, the at least one retrieved asset based on the sequence.

In an example embodiment, wherein predicting, by the electronic device, the sequence of the at least one asset to be offloaded for the subsequent UI transition based on the asset parameter using the ML model, includes: identifying, by the electronic device, the asset parameter of the at least one asset to be offloaded for the subsequent UI transition, determining, by the electronic device, whether an asset Identifier (ID) of the at least one asset is available at the memory, and performing, by the electronic device, one of: querying to the ML model based on the asset parameter of the at least one asset for predicting the sequence of the at least one asset to be offloaded for the subsequent UI transition, in response to determining that the asset ID of the at least one asset is available at the memory, and training the ML model using the asset parameter of the at least one asset to predict the sequence of the at least one asset to be offloaded for the subsequent UI transition, in response to determining that the asset ID of the at least one asset is unavailable at the memory.

In an example embodiment, the ML model is trained by recording an activity pattern and the asset parameter of the at least one asset executed for a session, estimating a sequence of the at least one asset for offloading based on the asset parameter, the activity pattern and a weight associated with the at least one asset, determining a gain in offloading the at least one asset as per the sequence, and modifying the sequence of the at least one asset for offloading based on the gain for predicting the sequence of the at least one asset to be offloaded for the subsequent UI transition.

In an example embodiment, wherein the asset parameter includes at least one of an asset ID, a time interval from process creation, a loading time of the asset, a memory utilized for the asset, an asset type, a frequency of asset utilization for every session and a context of the activity in which the asset loaded.

In an example embodiment, wherein offloading, by the electronic device, the at least one asset in the sequence, includes: determining, by the electronic device, a number of threads required to load the at least one asset in each thread based on a weight of a feature set and a rating for a value range of the feature set, wherein the feature set comprises a Central Processing Unit (CPU) usage, types of assets, a size of assets, a number of assets, and a device memory utilization, loading, by the electronic device, the at least one asset to each thread for a forecasted time interval in the sequence based on the feature set, and decoding, by the electronic device, the at least one asset in each thread.

In an example embodiment, the electronic device modifies the sequence of the at least one asset based on decoding times of the at least one asset, a time interval before which each asset should be decoded, and a change in a user activity pattern.

In an example embodiment, the value range and the weight of the feature set are variable based the number of assets decoded before a required time interval.

Accordingly, example embodiments herein provide the electronic device for accelerating the asset execution. The electronic device includes: an asset controller, a memory, a processor, wherein the asset controller is coupled to the memory and the processor. The asset controller is configured to: detect a user interface (UI) transition associated with the first application; predict the sequence of at least one asset to be offloaded for the subsequent UI transition based on the asset parameter using a machine learning (ML) model, wherein the subsequent UI transition is associated with at least one of the first application and the at least one second application; offload the at least one asset in the sequence; and store the at least one offloaded asset to the memory of the electronic device.

These and other aspects of various example embodiments herein will be better appreciated and understood when considered in conjunction with the following description and the accompanying drawings. It should be understood, however, that the following descriptions, while illustrating example embodiments and numerous specific details thereof, are given by way of illustration and not of limitation. Many changes and modifications may be made within the scope of the various example embodiments herein without departing from the spirit thereof, and the embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 5A is a diagram illustrating an example scenario of training an ML model by the electronic device using a user activity pattern and an asset parameter, according to various embodiments;

FIG. 6 is a diagram illustrating an example comparison of various embodiments with respect to a conventional method for the asset execution while launching an application in the electronic device, according to various embodiments.

DETAILED DESCRIPTION

Figure 1:
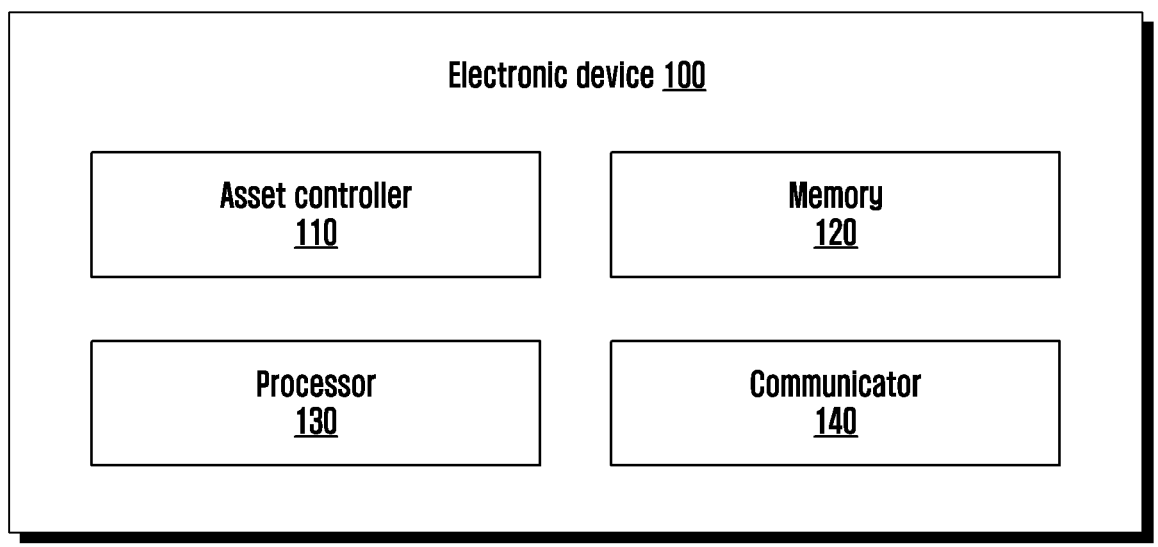
FIG. 1 is a block diagram illustrating an example electronic device for accelerating an asset execution, according to various embodiments.

The various example embodiments disclosed herein and the various features and advantageous details thereof are explained in greater detail with reference to the non-limiting example embodiments illustrated in the accompanying drawings and detailed in the following description. Descriptions of well-known components and processing techniques may be omitted so as to not unnecessarily obscure the embodiments herein. The various example embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practised and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, hardware components or the like, may be physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the example embodiments herein provide a method for accelerating an asset execution in an electronic device. The method may include: detecting, by the electronic device, a User Interface (UI) transition associated with a first application. Further, the method may include predicting, by the electronic device, a sequence of at least one asset to be offloaded for a subsequent UI transition based on an asset parameter using a Machine Learning (ML) model, where the subsequent UI transition is associated with the first application or a second application. Further, the method may include offloading, by the electronic device, the at least one asset in the sequence. Further, the method may include storing, by the electronic device, the at least one offloaded asset to a memory of the electronic device.

Unlike existing methods and systems, the electronic device loads and decodes at least one asset through multiple parallel threads based on the predicted sequence of the asset.

The electronic device stores the at least one asset to the memory in response to decoding the at least one asset. Upon detecting the subsequent UI transition, the electronic device retrieves the at least one decoded asset from the memory for the execution instead of spending time on loading and decoding the asset. Therefore, the UI transition occurs at the electronic device without any latency in the UI, which improves a user experience.

Referring now to the drawings, and more particularly to FIGS. 1, 2, 3, 4, 5A, 5B and 6, there are shown various example embodiments.

FIG. 1 is a block diagram illustrating an example electronic device 100 for accelerating an asset execution, according to various embodiments. An asset referred in this disclosure may include, for example, the asset of an application. The asset may include a set of one or more related artifacts that have been created or harvested for the purpose of applying that asset repeatedly in subsequent application development environments. The asset may include a static immutable resourceful material employed by the application code during the execution. Examples for the asset are, but not limited to drawables and animations (e.g. png, qmg, bmp, xml, svg, wbp, etc.), libraries (e.g. .so) and fonts (e.g. .ttf).

Examples for the electronic device 100 include, but not limited to, a smart phone, a tablet computer, a desktop computer, a personal digital assistance (PDA), an Internet of Things (IoT), and the like. In an embodiment, the electronic device 100 includes an asset controller (e.g., including processing circuitry and/or executable program elements) 110, a memory 120, a processor (e.g., including processing circuitry) 130, and a communicator (e.g., including communication circuitry) 140. In an embodiment, the asset controller 110 may include an Asset Sequence Prediction Model (ASPM) (e.g., including processing circuitry and/or executable program elements) 111, an Advanced Asset Offloader (AAO) (e.g., including processing circuitry and/or executable program elements) 112, a Cached Asset Handler (CAH) (e.g., including processing circuitry and/or executable program elements) 113 and an ML model (e.g., including processing circuitry and/or executable program elements) 114 as illustrated, for example, in FIG. 2.

The asset controller 110 may include various processing circuitry and/or executable program elements and is configured to record and identify a pattern of activities being performed by the user at the electronic device 100 and an asset parameter of the at least one asset executed during a session. The session may be an instant between a launch and a closure of the application at the electronic device 100. In an example scenario, the activities being performed by the user at the electronic device 100 during a session includes launching a video application at the electronic device 100, browsing a gallery application through the video application, selecting a video from the gallery application to play the video, setting brightness of a screen of the electronic device 100 to 40%, setting volume of sound at the electronic device 100 to 90%, pausing a playback of the video after each 30 minutes, closing the video application after completely watching the video. In an embodiment, the asset parameter includes at least one of an asset Identifier (ID) (e.g. 5485745), a time interval from process creation (e.g. 0.5 second), a loading time of the asset (e.g. 3 ms), a memory utilized for the asset (e.g. 1.5 kilo bytes), an asset type (e.g. .so, .xml, .png, etc.), a frequency of asset utilization for every session (e.g. 6 times per session) and a context of the activity in which the asset loaded. The asset controller 110 is configured to train the ML model 114 based on the pattern (also referred, for example, to as user activity pattern) and the asset parameter of the at least one asset using a Trie graph, Long Short-Term Memory (LSTM), Markov models, and the like. In an example scenario, the asset controller 110 is configured to train the ML model 114 by generating the Trie graph. The Trie graph may be generated by determining a relationship between the sequence in executing the asset and the frequency of the asset utilized during the session.

The asset controller 110 is configured to detect a User Interface (UI) transition associated with a first application in the electronic device 100. A change in the User Interface (UI) of the application due to the user activity at the electronic device is termed as the UI transition. In an example scenario, when the user taps on an app icon to launch the application, the UI transition occurs by changing the UI of the home screen to the UI of the application. Examples for the UI transition include, but are not limited to, an application launch, an activity transition, a multi-window, a change in screen orientation, a picture-in-picture transition, a language change, a font change, a screen mirroring, a screen extension, a screen casting, a loading from chat bubbles, an inter-device (e.g., IOT-based) loading display, an application switching, etc.

The asset controller 110 may be configured to predict a sequence of at least one asset to be offloaded for a subsequent UI transition based on the asset parameter using the ML model 114. In an embodiment, the subsequent UI transition may be associated with the first application. For example, consider an inbox page of a mail application being displayed by the electronic device 100 at time t1. Consider, the user inputs on a send page of the mail application after time t2. Further, the subsequent UI transition associated with the first application occurs at the electronic device 100 for opening the send page of the mail application from the inbox page of the mail application. In an embodiment, the subsequent UI transition may be associated with a second application in the electronic device 100. For example, consider the inbox page of the mail application is displaying by the electronic device 100 at time t1. Consider, the user inputs on an icon of a video application of the electronic device 100 after time t2. Further, the subsequent UI transition associated with the second application occurs at the electronic device 100 for opening the video application from the inbox page of the mail application. In an embodiment, the asset controller 110 may be configured to identify the asset parameter of the at least one asset to be offloaded for the subsequent UI transition. Further, the asset controller 110 may be configured to determine whether the asset ID of the at least one asset is available at the memory 120. The asset controller 110 may be configured to query to the ML model 114 using the asset parameter of the at least one asset, in response to determining that the asset ID of the at least one asset is available at the memory 120. Further, the asset controller 110 may be configured to predict the sequence of the at least one asset to be offloaded for the subsequent UI transition. The asset controller 110 may be configured to train the ML model 114 using the asset parameter of the at least one asset, in response to determining that the asset ID of the at least one asset is unavailable at the memory 120.

In an embodiment, the asset controller 110 may be configured to train the ML model 114 by recording the user activity pattern and the asset parameter of the at least one asset executed during the session. Further, the asset controller 110 may be configured to estimate the sequence of the at least one asset for offloading based on the asset parameter, the user activity pattern and a weight associated with the at least one asset. In an embodiment, the weight associated with the at least one asset is determined based on an importance of the feature sets. The asset controller 110 may be configured to determine a gain in offloading the at least one asset as per the sequence. The asset controller 110 may be configured to modify the sequence of the at least one asset for offloading based on the gain. In an example scenario, the asset controller 110 may be configured to offload the asset as per the predicted sequence the when the gain is there in offloading. The gain is there in offloading when a time required for executing the asset as per the prediction is comparatively less with respect to the time required for executing the asset as per a conventional method. The asset controller 110 may be configured to use the modified sequence for the prediction.

The asset controller 110 may be configured to offload the at least one asset in the predicted sequence. In an embodiment, the asset controller 110 may be configured to determine a number of threads (e.g., UI threads) required to load the at least one asset in each thread based on a weight "$w_i$," of a feature set and a rating "$r_i$," for a value range of the feature set. In an embodiment, the number of threads is determined using an equation 1.

Number of threads=$[\Sigma_i w_i * r_i]$ where, i is the $i^{th}$ feature set. The feature set includes a Central Processing Unit (CPU) (e.g. the processor 120) usage, types of assets, a size of assets, a number of assets, and a device memory utilization. The weight "$w_i$" of the feature set and the rating "$r_i$" assigned for each value range of the feature set in an example scenario are given by way of non-limiting example in Table-1.

TABLE 1

| Feature set (per time interval) | Weight ($w_i$) | Value Range | Rating ($r_i$) |
|---|---|---|---|
| Total number of assets | 0.25 | 1-4 | 1 |
|  |  | 5-7 | 2 |
|  |  | 8-10 | 3 |
|  |  | >10 | 4 |
| Number of assets with self time > 10 ms | 0.25 | 0 | 1 |
|  |  | 1 | 2 |
|  |  | 2-3 | 3 |
|  |  | >3 | 4 |
| CPU usage (in %) | 0.1 | =<20 | 4 |
|  |  | 20-45 | 3 |
|  |  | 45-75 | 2 |
|  |  | >75 | 1 |
| Types and size of assets | 0.3 | 1 > 1 MB .so | 2 |
|  |  | 1-2 >= 100 KB .png | 2 |
|  |  | Both of above | 3 |
|  |  | . . . | . . . |
| Device memory utilization (in %) | 0.1 | <40 | 4 |
|  |  | 40-60 | 3 |
|  |  | 60-80 | 2 |
|  |  | >=80 | 1 |

In the example scenario, when the number of the assets is 6, the electronic device 100 selects the weight as 0.25 and the rating as 2. When the number of assets with self-time>10 ms is 4, then the electronic device 100 selects the weight as 0.25 and the rating as 4. When the number of the CPU usage is 50%, then the electronic device 100 selects the weight as 0.1 and the rating as 2. When the type of the asset is ".so" and the size of asset is 1.2 MB, then the electronic device 100 selects the weight as 0.3 and the rating as 2. When the device memory utilization is 50%, the electronic device 100 selects the weight as 0.1 and the rating as 3. Further, the electronic device 100 determines the number of threads by adding 0.25×2, 0.25×4, 0.1×2, 0.3×2 and 0.1×3, which is equal to 2.6 threads. The electronic device 100 selects 3 thread to offload the assets. In another example, when the number of threads obtained using the equation 1 is 1.1, the electronic device 100 selects 2 threads.

The asset controller 110 may be configured to load the at least one asset to each thread for a forecasted time interval in the sequence based on the feature set. The time interval may be forecasted based on mean values of the timestamp (e.g., a point from an app process creation at which the asset was loaded by the app) calculated using a past usage history. Further, the asset controller 110 may be configured to decode the at least one asset in each thread for offloading the at least one asset. In an embodiment, the asset controller 110 may be configured to modify the sequence of the at least one asset based on decoding times of the at least one asset, a time interval before which each asset should be decoded, and a change in the user activity pattern. In an embodiment, the value range and the weight of the feature set varies based on the number of assets that needs to be decoded before a required time interval.

The asset controller 110 may be configured to store the at least one offloaded asset to the memory 120. The asset controller 110 may be configured to retrieve the at least one offloaded asset from the memory 120, in response to detecting the subsequent UI transition. Further, the asset controller 110 may be configured to execute the at least one retrieved asset.

At least one of the plurality of modules may be implemented through the ML model 114. A function associated with ML model 114 may be performed through the memory 120, and the processor 130.

The processor 130 may include various processing circuitry, such as, for example, one or a plurality of processors. One or a plurality of processors may refer, for example, to a general-purpose processor, such as a Central Processing Unit (CPU), an Application Processor (AP), a dedicated processor, or the like, a graphics-only processing unit such as a Graphics Processing Unit (GPU), a Visual Processing Unit (VPU), and/or an AI-dedicated processor such as a Neural Processing Unit (NPU).

In an embodiment, the one or a plurality of processors control processing of the input data in accordance with a predefined operating rule or ML model 114 stored in the memory 120. The predefined operating rule or ML model 114 is provided through training or learning.

Here, being provided through learning may refer, for example to, by applying a learning method to a plurality of learning data, a predefined operating rule or ML model 114 of a desired characteristic being made. The learning may be performed in the electronic device 100 itself in which the ML according to an embodiment is performed, and/or may be implemented through a separate server/system. The learning method may refer, for example, to a method for training a predetermined target device (for example, a robot, the electronic device 100 using a plurality of learning data to cause, allow, or control the target device to make a determination or prediction. Examples of learning methods include, but are not limited to, supervised learning, unsupervised learning, semi-supervised learning, or reinforcement learning.

The ML model 114 may include a plurality of neural network layers. Each layer has a plurality of weight values, and performs a layer operation through calculation of a previous layer and an operation of a plurality of weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

The memory 120 may store the application installed at the electronic device 100. The memory 120 stores the offloaded assets. The memory 120 may include non-volatile storage elements. Examples of such non-volatile storage elements may include magnetic hard discs, optical discs, floppy discs, Universal Flash Storage (UFS), Solid-State Drive (SSD), flash memories, or forms of an Electrically Programmable Memory (EPROM) or an Electrically Erasable and Programmable Memory (EEPROM).

In addition, the memory 120 may, in some examples, be considered a non-transitory storage medium. The "non-transitory" storage medium may not be embodied in a carrier wave or a propagated signal. However, the term "non-transitory" should not be interpreted that the memory 120 is non-movable. In some examples, the memory 120 can be configured to store larger amounts of information than the memory 120 respectively. In certain examples, a non-transitory storage medium may store data that can, over time, change (e.g., in Random Access Memory (RAM) or cache). The processor 130 may be configured to execute instructions stored in the memory 120. The communicator 140 may be configured to communicate internally between hardware components in the electronic device 100.

Although FIG. 1 shows the hardware components of the electronic device 100 it is to be understood that other embodiments are not limited thereto. In other embodiments, the electronic device 100 may include less or more number of components. Further, the labels or names of the components are used only for illustrative purpose and does not limit the scope of the disclosure. One or more components can be combined to perform the same or substantially similar function for accelerating the asset execution.

Figure 2:
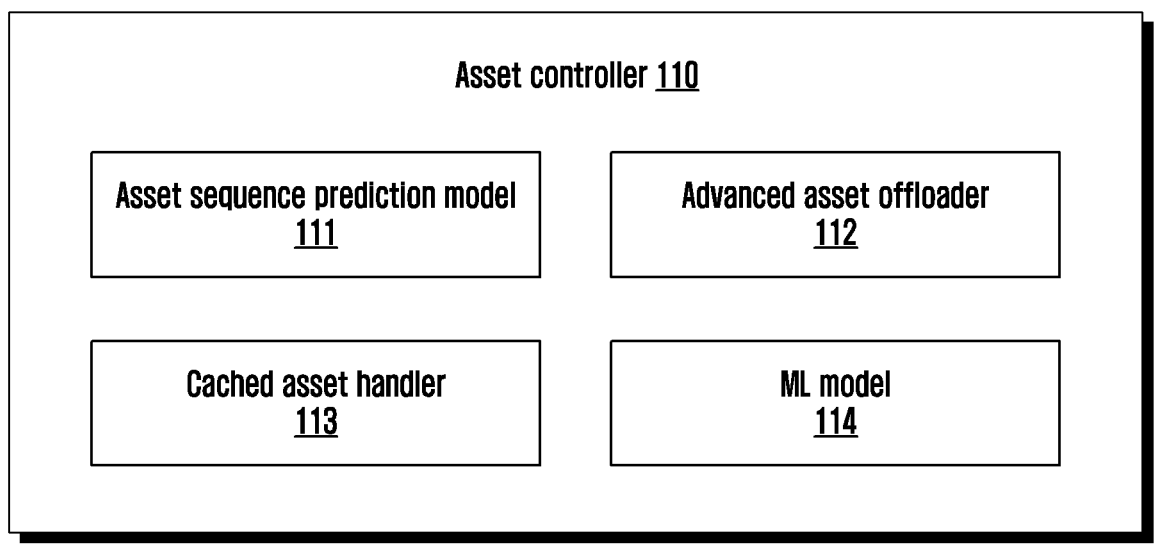
FIG. 2 is a block diagram illustrating an example asset controller for retrieving at least one offloaded asset from a memory and executing the at least one retrieved asset based on the sequence, in response to detecting a subsequent UI transition after a UI transition, according to various embodiments.

FIG. 2 is a block diagram illustrating an example asset controller 110 for retrieving the at least one offloaded asset from the memory 120 and executing the at least one retrieved asset based on the sequence, in response to detecting the subsequent UI transition after the UI transition, according to various embodiments. The ASPM 111 may include various processing circuitry and/or executable program elements and records and identifies the pattern of activities performing by the user at the electronic device 100 and the asset parameter of the at least one asset executed during the session. The ASPM 111 trains the ML model 114 based on the user activity pattern and the asset parameter of the at least one asset using, for example, and without limitation, the Trie graph, the LSTM, the Markov models, and the like. The ASPM 111 detects the UI transition associated with the first application in the electronic device 100. The ASPM 111 predicts the sequence of the at least one asset to be offloaded for the subsequent UI transition based on the asset parameter using the ML model 114.

In an embodiment, ASPM 111 identifies the asset parameter of the at least one asset to be offloaded for the subsequent UI transition. Further, the ASPM 111 determines whether the asset ID of the at least one asset is available at the memory 120. The ASPM 111 queries to the ML model 114 using the asset parameter of the at least one asset, in response to determining that the asset ID of the at least one asset is available at the memory 120. Further, the ASPM 111 predicts the sequence of the at least one asset to be offloaded for the subsequent UI transition. The ASPM 111 trains the ML model 114 using the asset parameter of the at least one asset, in response to determining that the asset ID of the at least one asset is unavailable at the memory 120.

In another embodiment, the ASPM 111 trains the ML model 114 by recording the user activity pattern and the asset parameter of the at least one asset executed during the session. Further, the ASPM 111 estimates the sequence of the at least one asset for offloading based on the asset parameter, the user activity pattern and the weight associated with the at least one asset. The ASPM 111 determines the gain in offloading the at least one asset as per the sequence. The AAO 112 modifies the sequence of the at least one asset for offloading based on the gain. Further, the ASPM 111 uses the modified sequence for the prediction.

The AAO 112 may include various processing circuitry and/or executable program elements and offloads the at least one asset in the predicted sequence. In an embodiment, the AAO 112 determines the number of UI threads required to load the at least one asset in each thread based on the weight "$w_i$" of the feature set and a rating "$r_i$" for the value range of the feature set. The AAO 112 loads the at least one asset to each thread for the forecasted time interval in the sequence based on the feature set. Further, the AAO 112 decodes the at least one asset in each thread for offloading the at least one asset. In an embodiment, the AAO 112 modifies the sequence of the at least one asset based on the decoding times of the at least one asset, the time interval before which each asset should be decoded, and the change in the user activity pattern. The CAH 113 may include various processing circuitry and/or executable program elements and stores the at least one offloaded asset to the memory 120. Further, the CAH 113 retrieves the at least one offloaded asset from the memory 120, in response to detecting the subsequent UI transition. Further, the processor 130 executes the at least one retrieved asset.

Although FIG. 2 shows the hardware components of the asset controller 110 it is to be understood that other embodiments are not limited thereto. In other embodiments, the asset controller 110 may include less or more number of components. Further, the labels or names of the components are used only for illustrative purpose and does not limit the scope of the disclosure. One or more components can be combined to perform the same or substantially similar function for retrieving the at least one offloaded asset from the memory 120 and executing the at least one retrieved asset based on the sequence.

Figure 3:
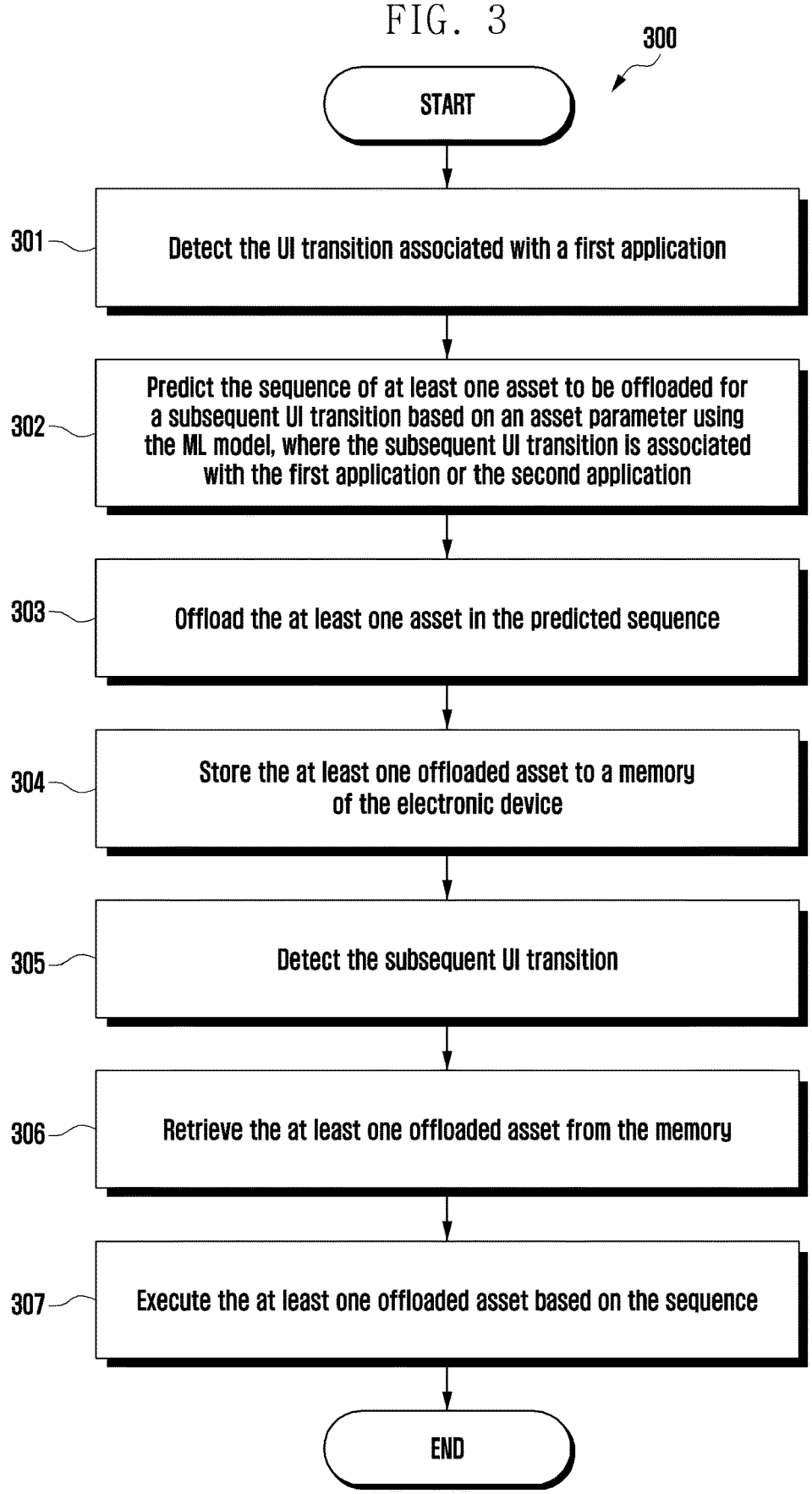
FIG. 3 is a flowchart illustrating an example method for accelerating the asset execution, according to various embodiments.

FIG. 3 is a flowchart 300 illustrating an example method for accelerating the asset execution, according to various embodiments. At operation 301, the method includes detecting the UI transition associated with the first application. In an embodiment, the method allows the ASPM 111 to detect the UI transition associated with the first application. At operation 302, the method includes predicting the sequence of the at least one asset to be offloaded for the subsequent UI transition based on the asset parameter using the ML model 114, where the subsequent UI transition is associated with the first application or the second application. In an embodiment, the method allows the ASPM 111 to predict the sequence of the at least one asset to be offloaded for the subsequent UI transition based on the asset parameter using the ML model 114, where the subsequent UI transition is associated with the first application or the second application.

At operation 303, the method includes offloading the at least one asset in the predicted sequence. In an embodiment, the method allows the AAO 112 to offload the at least one asset in the predicted sequence. At operation 304, the method includes storing the at least one offloaded asset to the memory 120 of the electronic device 100. In an embodiment, the method allows the CAH 113 to store the at least one offloaded asset to the memory 120 of the electronic device 100. At operation 305, the method includes detecting the subsequent UI transition. In an embodiment, the method allows the ASPM 111 to detect the subsequent UI transition. At operation 306, the method includes retrieving the at least one offloaded asset from the memory 120. In an embodiment, the method allows the CAH 113 to retrieve the at least one offloaded asset from the memory 120. At operation 307, the method includes executing the at least one retrieved asset based on the sequence. In an embodiment, the method allows the processor 130 to execute the at least one retrieved asset based on the sequence.

The various actions, acts, blocks, steps, or the like in the flowchart 300 may be performed in the order presented, in a different order or simultaneously. Further, in some embodiments, some of the actions, acts, blocks, steps, or the like may be omitted, added, modified, skipped, or the like without departing from the scope of the disclosure.

Figure 4:
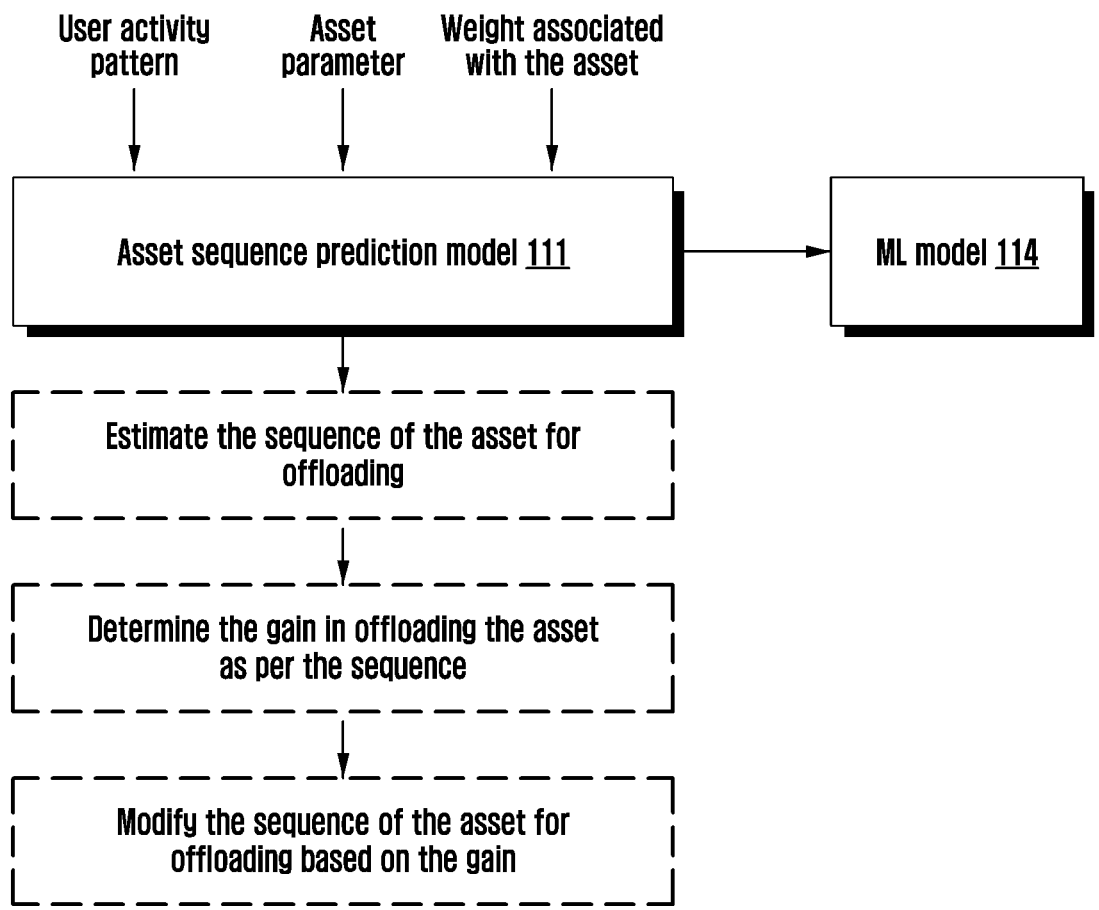
FIG. 4 is a flow diagram illustrating an example method of determining a gain in offloading the asset for modifying the sequence of at least one asset for offloading, according to various embodiments.

FIG. 4 is a flow diagram illustrating an example method of determining the gain in offloading the asset for modifying the sequence of the at least one asset for offloading, according to various embodiments. Initially, the ASPM 111 records the user activity pattern and the asset parameter of the at least one asset executed during the session. Further, the ASPM 111 determines the weight associated with the at least one asset. Further, the ASPM 111 estimates the sequence of the at least one asset for offloading based on the asset parameter, the user activity pattern and the weight associated with the at least one asset using the ML model 114. Further, the ASPM 111 determines the gain in offloading the at least one asset as per the sequence. Further, the AAO 112 modifies the sequence of the at least one asset for offloading based on the gain. In response to modifying the sequence, the ASPM 111 uses the modified sequence for the prediction.

Figure 5B:
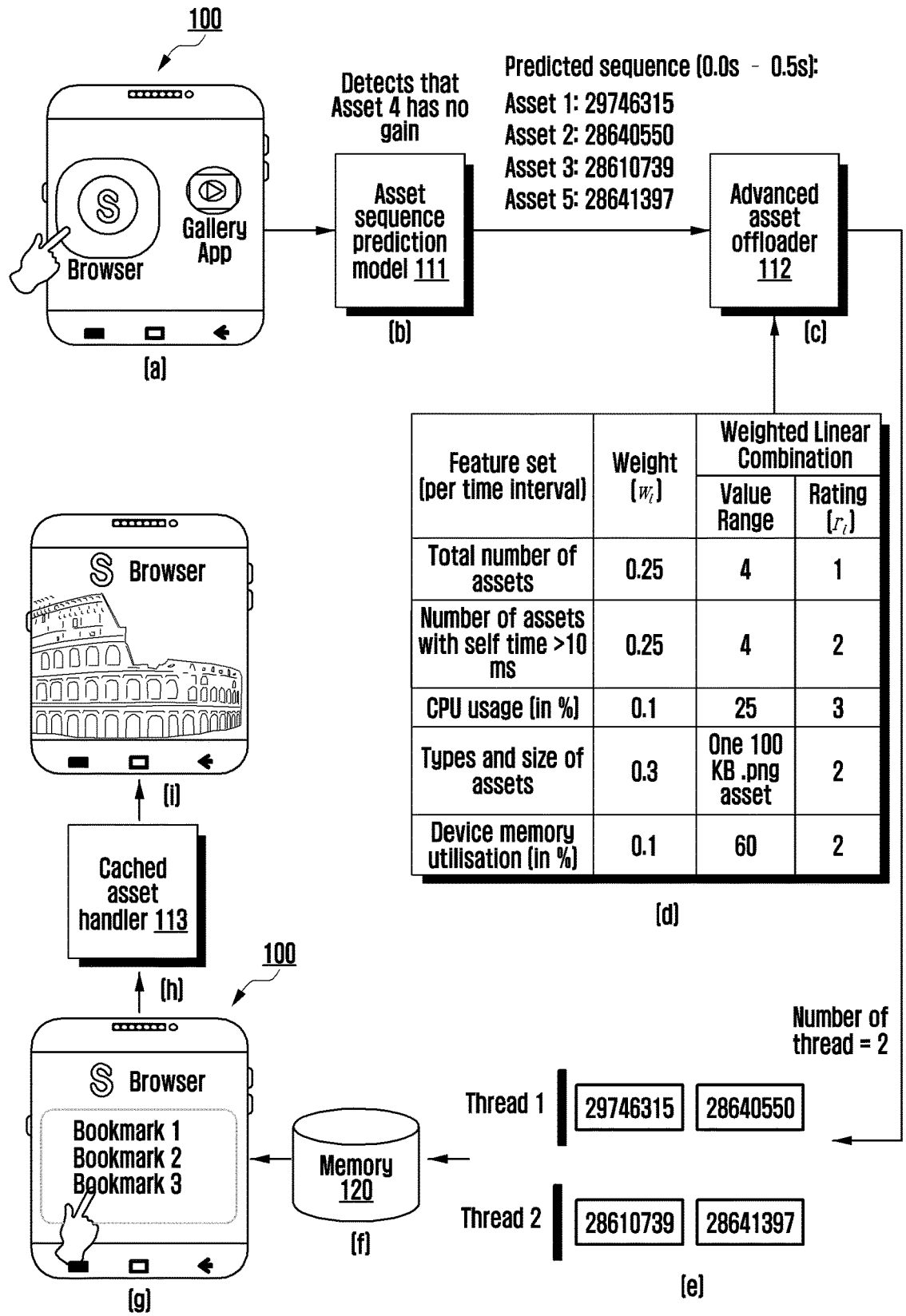
FIG. 5B is a diagram illustrating an example scenario of executing the at least one offloaded asset for the subsequent UI transition by the electronic device, where the sequence of the at least one asset is predicted for offloading after the UI transition, according to various embodiments.

FIG. 5A is a diagram illustrating an example scenario of training the ML model 114 by the electronic device 100 using the user activity pattern and the asset parameter, according to various embodiments. Consider, the user taps on an icon of a browser app in the home screen of the electronic device 100 as shown in notation (a) of FIG. 5A. Further, the electronic device 100 launches the browser app and the ASPM 111 detects the UI transition. The user selects a bookmark (e.g., bookmark 3, refer to FIG. 5B) in the browser app. Further, the ASPM 111 records the pattern of the user activities in the application and the asset parameter of five assets loaded for the session until the application closes. The ASPM 111 stores the user activity pattern and the asset parameter to the memory 120. Further, the ASPM 111 analyses the asset parameter of each asset as shown in notation (b) of FIG. 5A. In an example, the ASPM 111 trains the ML model 114 by generating the Trie graph as shown in notation (c) of FIG. 5A. The Trie graph may be generated by determining the relationship between the sequence in executing the asset and the frequency of the asset utilized during the session. Similarly, the ASPM 111 can train the ML model 114 using, but not limited to the LSTM, the Markov models, and the like, by determining the relationship between the asset parameters.

FIG. 5B is a diagram illustrating an example scenario of executing the at least one offloaded asset for the subsequent UI transition by the electronic device 100, where the sequence of the at least one asset is predicted for offloading after the UI transition, according to various embodiments. Consider, the ASPM 111 has trained the ML model 114 as illustrated in FIG. 5A. Consider, the user further taps on the icon of the browser app in the home screen of the electronic device 100 as shown in notation (a) of FIG. 5B. Further, the electronic device 100 launches the browser app and the ASPM 111 detects the UI transition. Further, the ASPM 111 identifies the asset parameter of the five assets to be offload for the subsequent UI transition. Further, the ASPM 111 determines that the asset ID of each asset is available in the memory 120. Further, the ASPM 111 estimates the sequence of the five assets for offloading based on the asset parameter, the user activity pattern and the weight associated with each asset. Further, the ASPM 111 determines whether the gain is there in offloading the five assets as per the sequence.

Consider, the ASPM 111 detects that no gain is there in offloading "Asset 4" out of the five assets as shown in notation (b) of FIG. 5B. Further, the ASPM 111 predicts the sequence of the four assets "Asset 1, Asset 2, Asset 3, Asset 5" by excluding the "Asset 4" to be offloaded for the subsequent UI transition. Further, the AAO 112 receives the predicted sequence of the four assets "Asset 1, Asset 2, Asset 3, Asset 5" from the ASPM 111 as shown in notation (c) of FIG. 5B. Further, the AAO 112 determines the weight and the rating for each feature set based on the value range of the four assets "Asset 1, Asset 2, Asset 3, Asset 5" as shown in notation (d) of FIG. 5B. Further, the AAO 112 determines the number of threads required to load the four assets "Asset 1, Asset 2, Asset 3, Asset 5" as given below.

$$\text{Number of threads} = [0.25 \times 1 + 0.25 \times 2 + 0.1 \times 3 + 0.3 \times 2 + 0.1 \times 2] = [1.85] = 2$$

Further, the AAO 112 loads the four assets "Asset 1, Asset 2, Asset 3, Asset 5" to the two thread for the forecasted time interval in the sequence as shown in notation (e) of FIG. 5B. Further, the AAO 112 decodes the assets in each thread. Further, the CAH 113 stores the decoded assets (e.g., offloaded assets) to the memory 120 as shown in notation (f) of FIG. 5B.

Consider, the user selects the bookmark 3 in the browser app as shown in notation (g) of FIG. 5B. Further, the ASPM 111 detects the subsequent UI transition. Further, the CAH 113 retrieves the decoded assets (e.g., offloaded assets) from the memory 120 to execute the decoded assets as shown in notation (h) of FIG. 5B. Further, the processor 130 executes the decoded assets and opens the webpage corresponds to the bookmark 3 as shown in notation (i) of FIG. 5B. Thus, the electronic device 100 is able to execute the decoded assets without spending time on loading and decoding the asset for the subsequent UI transition as in the conventional methods FIG. 6 is a diagram illustrating an example comparison of the proposed method with respect to the conventional method for the asset execution while launching the application in the electronic device 100, according to various embodiments. The asset execution for the application launch based on the conventional method is shown above a Timeline. The asset execution for the application launch based on the proposed method is shown below the Timeline. Based on the conventional method, the electronic device 100 initially performs a bindApplication step for the application launch. Further, the electronic device 100 loads "lib1.so" asset at an activityStart step, which is an instance of third-party or shared library getting processed. Also, the electronic device 100 unpacks "font1" asset at the activityStart step, where the application loads customised fonts. Further, the electronic device 100 decodes a drawable 1, i.e. "XML1" asset at the Choreographer #doFrame1 step, where decoding the drawable 1 consumes critical process time.

Based on the proposed method, the electronic device 100 determines the gain in offloading the assets as per the predicted sequence. Further, the electronic device 100 selects the "lib1.so" asset, the "font1" asset, and the "XML1" asset to offload as per the predicted sequence. Consider, the electronic device 100 determines that two threads are required to offload the assets. The electronic device 100 performs the bindApplication step for the application launch. The electronic device 100 loads "lib1.so" asset and unpacks "font1" asset in a thread 1 during the bindApplication step. Also, the electronic device 100 decodes the drawable 1, i.e. "XML1" asset in a thread 2 during the bindApplication step. Further, the CAH 113 of the electronic device 100 stores the offloaded assets to the memory 120. In response to reaching the activityStart step, the CAH 113 retrieves the offloaded "lib1.so" and "font1" assets from the memory 120, where the time required to perform the activityStart step is reduced using the proposed method. Further, in response to reaching the #doFrame1 step, the CAH 113 retrieves the offloaded "XML1" asset from the memory 120, where the time required to perform the #doFrame1 step is reduced using the proposed method. Therefore, a total duration of 'X' seconds is less required for the application launch as per the proposed method with respect to the conventional method.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A method for accelerating an asset execution in an electronic device, comprising:
    detecting, by the electronic device, a User Interface (UI) transition associated with a first application;
    predicting, by the electronic device, a sequence of at least one asset to be offloaded for a subsequent UI transition based on an asset parameter using a Machine Learning (ML) model;
    offloading, by the electronic device, the at least one asset in the sequence; and
    storing, by the electronic device, the at least one offloaded asset to memory of the electronic device,
    wherein offloading the at least one asset in the sequence comprises:
        determining, by the electronic device, a number of threads required to load the at least one asset in each thread based on a weight of a feature set and a rating for a value range of the feature set, wherein the feature set comprises a Central Processing Unit (CPU) usage, types of assets, a size of assets, a number of assets, and a device memory utilization;
        loading, by the electronic device, the at least one asset to each thread for a forecasted time interval in the sequence based on the feature set; and
        decoding, by the electronic device, the at least one asset in each thread.

2. The method of claim 1, further comprising:
    detecting, by the electronic device, the subsequent UI transition;
    retrieving, by the electronic device, the at least one offloaded asset from the memory; and
    executing, by the electronic device, the at least one retrieved asset based on the sequence.

3. The method of claim 1, wherein predicting, by the electronic device, the sequence of the at least one asset to be offloaded for the subsequent UI transition based on the asset parameter using the ML model, comprises:
    identifying, by the electronic device, the asset parameter of the at least one asset to be offloaded for the subsequent UI transition;
    determining, by the electronic device, whether an asset identifier (ID) of the at least one asset is available at the memory; and
    performing, by the electronic device, at least one of:
        querying to the ML model based on the asset parameter of the at least one asset for predicting the sequence of the at least one asset to be offloaded for the subsequent UI transition, in response to determining that the asset ID of the at least one asset is available at the memory, and
        training the ML model using the asset parameter of the at least one asset to predict the sequence of the at least one asset to be offloaded for the subsequent UI transition, in response to determining that the asset ID of the at least one asset is unavailable at the memory.

4. The method of claim 3, wherein training the ML model comprises:
    recording an activity pattern and the asset parameter of the at least one asset executed for a session;
    estimating a sequence of the at least one asset for offloading based on the asset parameter, the activity pattern and a weight associated with the at least one asset;
    determining a gain in offloading the at least one asset based on the sequence; and
    modifying the sequence of the at least one asset for offloading based on the gain for predicting the sequence of the at least one asset to be offloaded for the subsequent UI transition.

5. The method of claim 1, wherein the asset parameter includes at least one of an asset ID, a time interval from process creation, a loading time of the asset, a memory utilized for the asset, an asset type, a frequency of asset utilization for every session and a context of an activity in which the asset loaded.

6. The method of claim 1, further comprising modifying the sequence of the at least one asset based on decoding times of the at least one asset, a time interval before which each asset should be decoded, and a change in activity pattern.

7. The method of claim 1, wherein the value range and the weight of the feature set are variable based a number of assets decoded before a required time interval.

8. The method of claim 1, wherein the subsequent UI transition is associated with the first application.

9. The method of claim 1, wherein the subsequent UI transition is associated with a second application.

10. An electronic device configured to accelerate an asset execution, the electronic device comprising:
    memory;
    a processor; and
    an asset controller connected to the memory and the processor-, wherein the asset controller is configured to:
        detect a User Interface (UI) transition associated with a first application,
        predict a sequence of at least one asset to be offloaded for a subsequent UI transition based on an asset parameter using a Machine Learning (ML) model, offload the at least one asset in the sequence, and
store the at least one offloaded asset to the memory of the electronic device,
wherein, when offloading the at least one asset in the sequence, the asset controller is configured to:
determine a number of threads required to load the at least one asset in each thread based on a weight of a feature set and a rating for a value range of the feature set, wherein the feature set comprises a Central Processing Unit (CPU) usage, types of assets, a size of assets, a number of assets, and a device memory utilization;
load the at least one asset to each thread for a forecasted time interval in the sequence based on the feature set; and
decode the at least one asset in each thread.

11. The electronic device of claim 10, wherein the asset controller is configured to:
detect the subsequent UI transition;
retrieve the at least one offloaded asset from the memory; and
execute the at least one retrieved asset based on the sequence.

12. The electronic device of claim 10, wherein the asset controller is configured to predict the sequence of the at least one asset to be offloaded for the subsequent UI transition based on the asset parameter using the ML model by:
identifying the asset parameter of the at least one asset to be offloaded for the subsequent UI transition;
determining whether an asset Identifier (ID) of the at least one asset is available at the memory; and
performing at least one of:
querying to the ML model based on the asset parameter of the at least one asset for predicting the sequence of the at least one asset to be offloaded for the subsequent UI transition, in response to determining that the asset ID of the at least one asset is available at the memory, and
training the ML model using the asset parameter of the at least one asset to predict the sequence of the at least one asset to be offloaded for the subsequent UI transition, in response to determining that the asset ID of the at least one asset is unavailable at the memory.

13. The electronic device of claim 12, wherein the ML model is trained by:
recording an activity pattern and the asset parameter of the at least one asset executed during a session;
estimating a sequence of the at least one asset for offloading based on the asset parameter, the activity pattern and a weight associated with the at least one asset;
determining a gain in offloading the at least one asset as per the sequence; and
modifying the sequence of the at least one asset for offloading based on the gain for predicting the sequence of the at least one asset to be offloaded for the subsequent UI transition.

14. The electronic device of claim 10, wherein
the asset parameter includes at least one of an asset ID, a time interval from process creation, a loading time of the asset, a memory utilized for the asset, an asset type, a frequency of asset utilization for every session and a context of an activity in which the asset loaded.

15. The electronic device of claim 10, wherein the asset controller is configured to modify the sequence of the at least one asset based on decoding times of the at least one asset, a time interval before which each asset should be decoded, and a change in an activity pattern.

16. The electronic device of claim 10, wherein the value range and the weight of the feature set are variable based the number of assets decoded before a required time interval.

17. The electronic device of claim 10, wherein the subsequent UI transition is associated with the first application.

18. The electronic device of claim 10, wherein the subsequent UI transition is associated with a second application.

* * * * *